United States Patent [19]

Mushardt

[11] Patent Number: 5,013,014

[45] Date of Patent: May 7, 1991

[54] FIXTURE FOR WORKPIECES, PARTICULARLY TURBINE BLADES

[75] Inventor: Heinrich Mushardt, Neu-Börnsen, Fed. Rep. of Germany

[73] Assignee: Körber AG, Hamburg, Fed. Rep. of Germany

[21] Appl. No.: 914,813

[22] Filed: Oct. 3, 1986

[30] Foreign Application Priority Data

Oct. 8, 1985 [DE] Fed. Rep. of Germany ....... 3535809

[51] Int. Cl.$^5$ ............................................. B25B 1/00
[52] U.S. Cl. ................................................ 269/7
[58] Field of Search ..................... 269/7; 29/464, 467, 29/468; 51/216 LP, 277

[56] References Cited

U.S. PATENT DOCUMENTS

| 175,862 | 4/1876 | King | 269/7 |
| 2,855,664 | 10/1958 | Griffith et al. | 269/7 |
| 3,594,899 | 7/1971 | Hunt | 269/7 |
| 4,528,208 | 7/1985 | Hirvonen et al. | 269/7 |

FOREIGN PATENT DOCUMENTS 619321 8/1978 U.S.S.R. ................................. 269/7

*Primary Examiner*—Robert C. Watson
*Attorney, Agent, or Firm*—Peter K. Kontler

[57] ABSTRACT

A fixture for workpieces which are poorly adapted for direct clamping on a machine tool comprises a casing having an upper part and a lower part. The casing has a cavity whose shape roughly corresponds to the contour of the workpiece. The remaining interstitial space or crack between the inner casing wall and the workpiece is filled with a hardenable casting material so that the workpiece is securely held when the casting material sets around it. For clamping of the securing body onto a grinding machine, lathe, or other machine tool, the casing comprises a clampable portion with reference surfaces.

35 Claims, 4 Drawing Sheets

FIXTURE FOR WORKPIECES, PARTICULARLY TURBINE BLADES

CROSS-REFERENCE TO RELATED APPLICATIONS

Commonly owned copending patent application Ser. No. 790,81, filed Oct. 24, 1984 now abandoned, corresponding to German patent application P 34 39 439.7, filed Oct. 27, 1984, discloses a cast metallic fixture for workpieces, together with a method and apparatus for breaking up the fixture after the workpiece has been treated. Ser. No. 790,863, in turn, refers to commonly owned application Ser. No. 638,886, filed Aug. 8, 1984 now abandoned. The disclosures of these prior applications are hereby incorporated by reference.

BACKGROUND OF THE INVENTION

The present invention relates generally to a fixture for holding workpieces, particularly turbine blades, which are not readily suited for direct gripping, and more particularly to a fixture in which the cavity or interstitial space, between the inserted part of the workpiece and the corresponding or adjacent inner walls of the fixture is filled with a casting material.

Particularly in the case of turbine blades, the problem arises that the blades must be held by already-machined portions thereof in order, for example, to perform a grinding operation on the blade tips or blade bases, or on the inner and outer circumferences of blade guide ring segments.

Direct clamping or gripping of such workpieces without damaging them is impossible with conventional tools because of the complicated geometrical forms of the workpieces, Therefore, such workpieces are cast into a so-called "casting block" which encapsulates the workpiece up to the free portions to be treated or machined, and which can be mounted on a machine tool. The block comprises casting material, such as a hardened tin-lead-antimony alloy, which surrounds the workpiece.

After the treatment or machining of the workpiece, it is necessary to free the workpiece again from the casting block. This can be done by melting the block material or mechanically comminuting the casting block.

A particularly advantageous configuration for such a casting block, and corresponding comminuting means for this block, for freeing of the workpiece after its treatment, are disclosed in commonly owned copending U.S. Pat. application Ser. No. 790,863, filed Oct. 24, 1985 now abandoned and in the corresponding German patent application P 34 39 439.7, filed Oct. 27, 1984. Such a casting block is only a single-use securing means, which is destroyed and discarded after the treatment of the workpiece.

However, it is also known to employ a re-usable carrier element, which accepts the workpiece to be secured, and in which the remaining space between the carrier element and the workpiece is filled with a casting material Such a securing means is disclosed in German Published Patent Application DE-OS 33 02 823, assigned to the assignee of the present invention. The necessary separation of the workpiece from the carrier element is accomplished there by melting away of the casting material.

OBJECTS AND SUMMARY OF THE INVENTION

It is an object of the present invention to provide a securing body or fixture, for complicated workpieces poorly adapted for direct clamping, particularly for turbine blades, which is re-usable, mountable on a machine tool in a predefined way, and permits easy separation of the workpiece from the securing body without melting of the casting material.

Briefly, the fixture of the present invention comprises a separable casing whose parts are detachably connected to each other. Reference surfaces are rigid with at least one casing part for gripping the securing body. Preferably, the casing is divided into a first part and a second part, and the first part is disposed at a level above the second part when the reference surfaces are held in a machine tool In a presently preferred embodiment, the reference surfaces are disposed directly on one casing part.

Alternatively, it is possible, in accordance with another feature of the invention, to dispose the reference surfaces on a separate clampable element connected to a casing part.

Yet another feature of the invention provides a seal around a projecting part of the workpiece to minimize escape of hardenable casting material from the casing.

A significant feature of the invention is the use of a seal which keeps at least one edge of the workpiece free of casting material, in order to prevent formation of a closed coating or envelope of casting material on the workpiece. This has the result that, upon separation of the casing into parts, the casting material falls apart into little pieces and easy removal of the workpiece is facilitated. Melting away the casting material is thereby obviated.

It is desirable that the sealing element be formed and extend along the workpiece edge into the holding or clamping region inside the casing, as a strip. This prevents the casting material on one side of the workpiece from bonding to the casting material on the other side of the workpiece. A complete coating of the workpiece with casting material is thus precluded.

As previously noted, the casing parts are separably joined together In general, one could use a conventional screw fastening. However, according to another feature of the invention, it is also possible to connect two casing parts by means of the casting material, which flows between the casing parts and into respective recesses within each. This connection is easy to break, upon separation of the casing into its parts.

If the workpiece to be secured comprises multiple mutually spaced parts, such as multi-vaned turbine guide blades, the invention provides that at least one casing part has chambers, for the individual workpiece parts, particularly blade sheets, formed by separating elements.

The invention also features separate, removable inserts disposed at the insertion points of the workpiece parts into the casing. This further facilitates the removal of the workpiece from the casing.

The novel features which are considered as characteristic of the invention are set forth in particular in the appended claims. The improved fixture itself, however, both as to its construction and the mode of using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
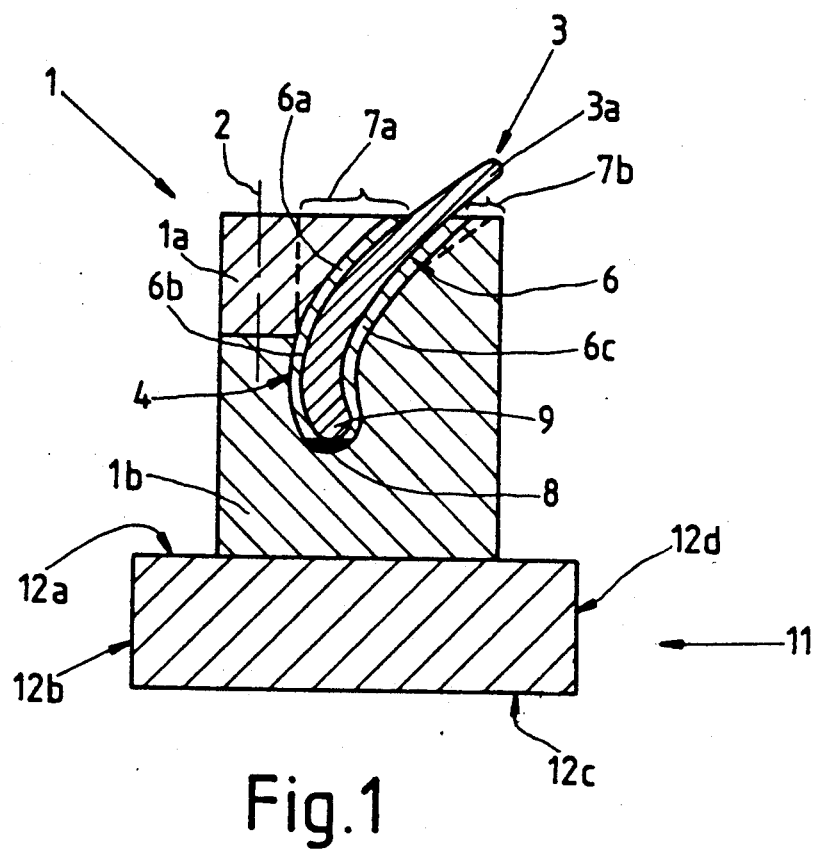
FIG. 1 is a cross-sectional view of a securing body for holding a single turbine blade.

FIG. 1 shows a securing body or fixture, for a single turbine blade, formed as a casing 1, with an upper part 1a and a lower part 1b. Upper part 1a and lower part 1b are separably joined, for example by a screw connection 2 schematically indicated by a dash-dotted line. Both upper part 1a and lower part 1b are so configurated inside that they form a cavity 4 which corresponds only roughly to the contours of the workpiece 3, here a turbine blade 3a, which is received in the cavity.

The interstitial space or crack between workpiece 3 and casing 1 remaining, after insertion of workpiece 3 into cavity 4, is filled with a casing material 6 which is poured in a hardenable state through fill openings (not shown) and then hardened. The fill openings may be disposed in regions 7a, 7b behind the section plane shown in FIG. 1, and communicate with the cavity 4. At the base of cavity 4, a sealing element 8 is disposed, so that it rests along the lower workpiece edge 9 and divides the interstitial space or crack between the inner wall of casing 1 and workpiece 3 at this point. This prevents the formation of a closed coating or envelope of casting material 6 around the workpiece 3. This means that a so-called "form lock" between the hardened casting material 6 and the workpiece 3 is avoided, and thus facilitates subsequent removal of workpiece 3 from casing 1, or "un-forming". The hardened casting material 6 will fall apart into multiple pieces 6a, 6b, 6c.

The workpiece 3 held in casing 1 can be treated or machined on its remaining portions which extend outside of casing 1. For the necessary fastening onto a machine tool, casing 1 is provided with corresponding reference surfaces. In the embodiment of FIG. 1, a clampable part 11, connectable to casing 1, is provided. Clampable part 11 can be a clampable pallet universally adapted to accept various kinds of casings 1 since, unlike casing 1, it need not be even roughly conform to the shape of workpiece 3. All the reference surfaces 12a, 12b, 12c, and 12d necessary for clamping in a predefined position are provided on this clampable element 11.

Figure 2:
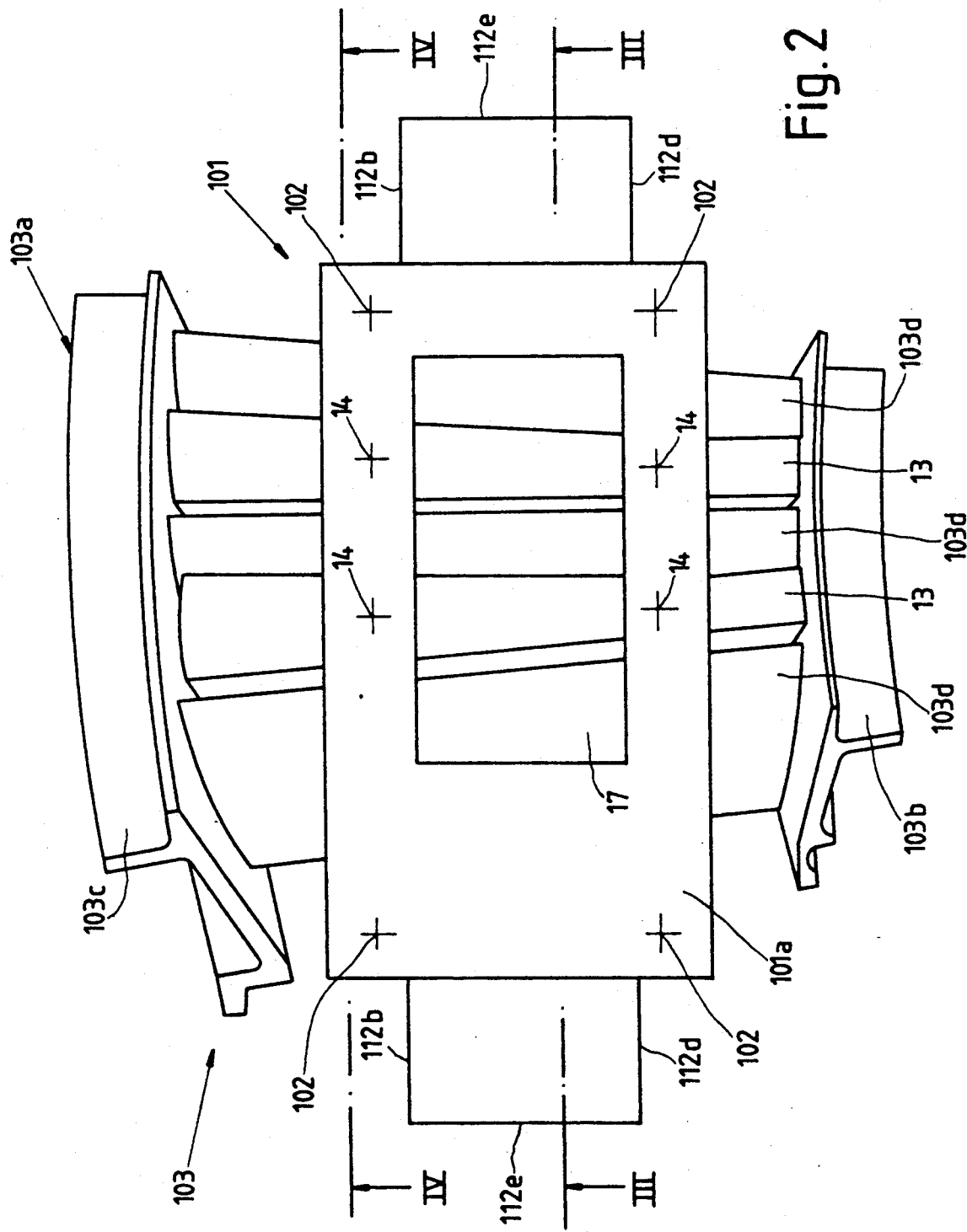
FIG. 2 is a perspective view of a securing body for holding a segment multi-vane turbine blade wheel.
Figure 3:
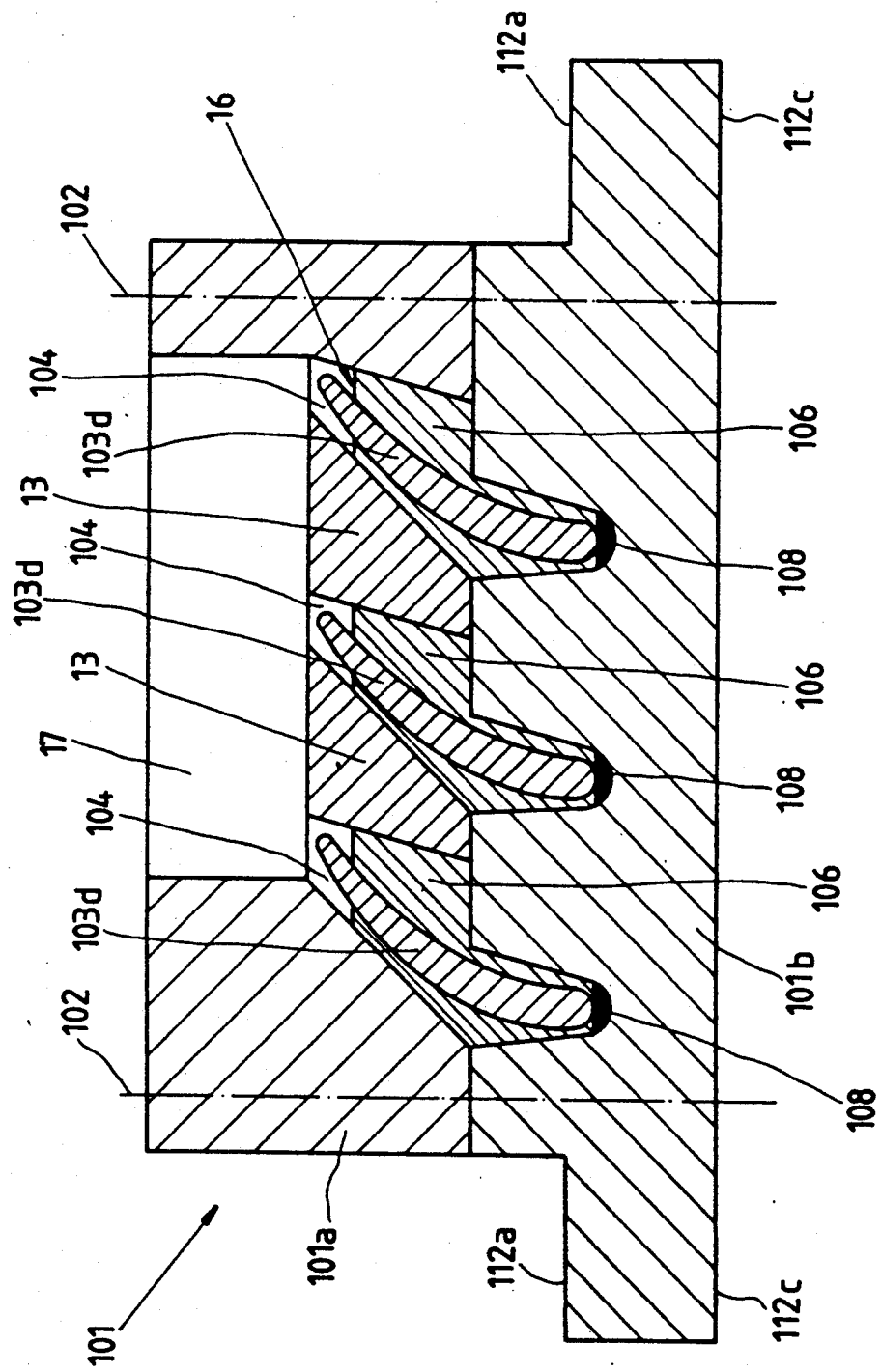
FIG. 3 is a cross-section along line III—III of FIG. 2.
Figure 4:
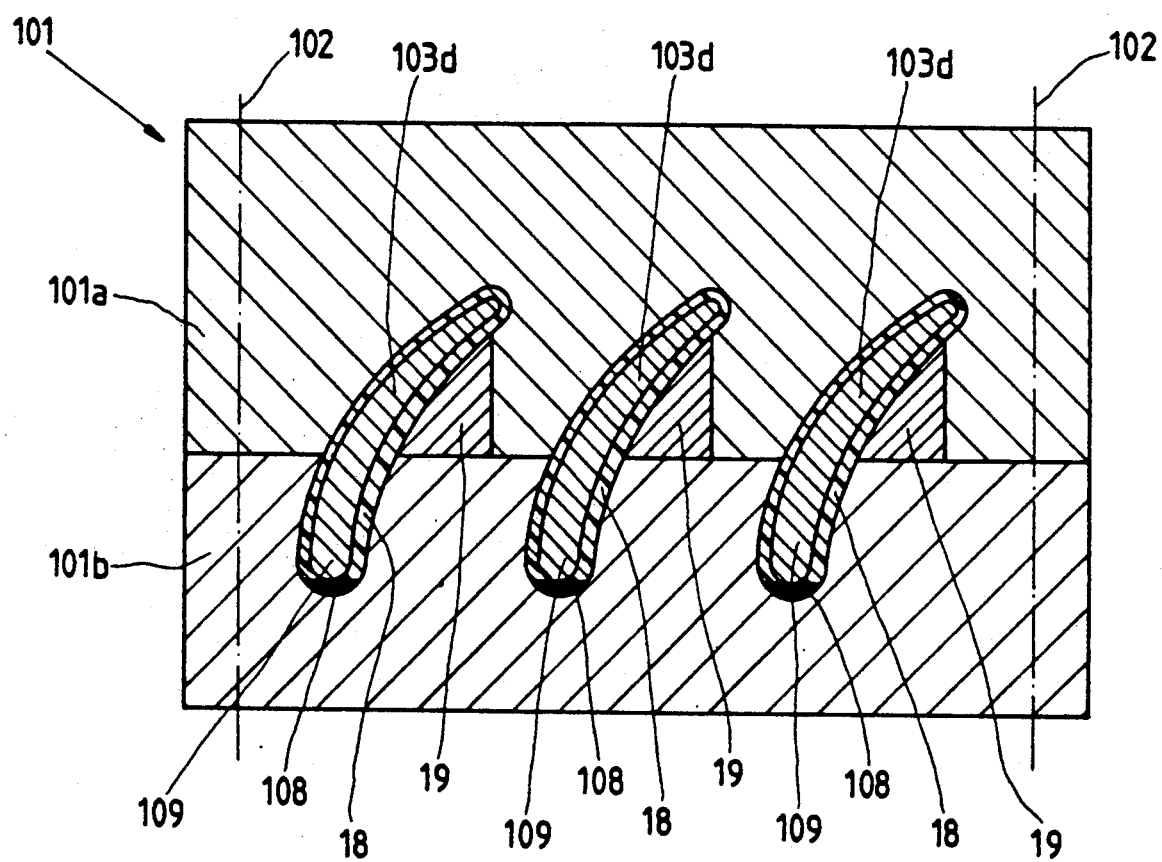
FIG. 4 is a cross-section along line IV—IV of FIG. 2.

FIGS. 2-4 show a securing body for a multi-vaned turbine blade wheel. In FIG. 2, functionally corresponding elements are designated with reference numerals incremented by 100 from the reference numerals used in FIG. 1.

The securing body or fixture is also formed as a casing 101 with an upper part 101a and a lower part 101b. Parts 101a, 101b are separably joined by a plurality of screw connections 102 shown only schematically in the drawing. Workpiece 103 is a turbine blade wheel segment 103a, which comprises a inner wheel segment 103b and an outer wheel segment plurality of guide vanes 103d running between an casing 101 in the area of the guide vanes 103d, so that the projecting inner and outer wheel segments 103b, 103c can be treated or machined. Upper part 101a and lower part 101b of casing 101 define multiple cavities 104 corresponding to the number of guide blade sheets 103d to be received. For this purpose, upper part 101a has multiple separating elements 13 which are fastened to it by means of fastening elements 14, shown only schematically, or which are integral with it.

The remaining interstitial spaces or cracks between the vanes 103d and the casing inner walls are filled with casting material 106, indeed filled up to a level 16, shown in FIG. 3, just below the upper edges of the vanes. The access for the filling process is through an aperture 17 in upper part 101a.

As with the embodiment of FIG. 1, the bases of the cavities 101 are provided with respective sealing elements 108. These sealing elements 108, together with the filling level or limit 16 below the vane edges, again assure against formation of a closed coating or envelope of hardened casting material around the vanes 103d.

As shown in FIG. 4, sealing at the mouth of cavity 104, i.e. the exit points from casing, 101 on both sides of the vanes 103d, is achieved by sealing elements 18 which extend around the circumferences of the vane cross-sections. This prevents sidewise escape of still-molten casting material 106 from casing 101.

Additionally, separate inserts 19 are provided in the vicinity of the vane exit points in upper part 101a, i.e. the cross-over points between respective cavities of upper part 101a and lower part 101b. These inserts 19 are removable during "un-forming", i.e. the removal of workpiece 103 from casing 101, to make the un-forming easier.

In contrast to the embodiment of FIG. 1, the reference surfaces 112a, 112b, 112c, 112d, 112e for clamping of casing 101 onto a machine tool are provided directly on lower part 101b of casing 101, as shown in FIGS. 2 and 3.

Figure 5:
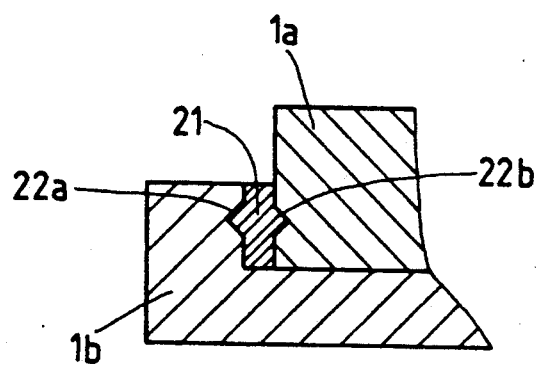
FIG. 5 shows an alternative connection for two separable casing parts.

FIG. 5 shows an alternate means for connecting upper part 101a and lower part 101b of casing 101 together, instead of screw connections 2. Here, the connecting element 21 comprises part of the casting material used in securing a workpiece in the casing 1. The casting material flows into respective recesses 22a, 22b in upper part 1a and lower part 1b and sets to connect parts 1a, 1b to each other. For undoing this connection, the casting material is readily breakable.

Suitable casting materials include casting resins, molten metals or metal alloys, or molten plastics.

Prior to pouring the casting material into casing 1, 101, workpiece 3, 103, one must, naturally, precisely position it, by means of special apparatus which is beyond the scope of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A securing body for workpieces which cannot be readily clamped directly on a machine tool, particularly for turbine blades, in which at least one portion of the workpiece is received in at least on cavity provided within the securing body and having a mouth and the remaining space between the workpiece portion and the adjacent walls surrounding the cavity is filled with a hardenable casting material, comprising a casing having a plurality of separable parts which define the at least one cavity, at least one of said parts being rigid with reference surfaces adapted to permit clamping of said one part of a machine tool; and sealing means disposed adjacent to the mouth of the one cavity to surround a projecting portion of the workpiece and to thereby minimize escape of flowable casting material from said casing.

2. The securing body according to claim 1, wherein said casing comprises a first part and a second part.

3. The securing body according to claim 2, wherein said first part is disposed at a level above said second part when said one part is clamped on the machine tool.

4. A securing body according to claim 1, wherein said reference surfaces are provided directly on said one part.

5. The securing body according to claim ,1 further comprising a clampable element connected to one of said parts, said reference surfaces being provided on said clampable element.

6. The securing body according to claim 1, further comprising sealing means disposed in the cavity at least along one edge of the workpiece and arranged to maintain the edge free of casting material to thereby prevent the formation of a closed, hardened coating of casting material around the workpiece.

7. 8. The securing body according to claim 1, wherein said sealing means includes a strip which fills a portion of the cavity in said casinq.

8. The securing body according to claim 1, wherein said casing comprises a first part and a second part, each of said first and second parts having a recess for a unitary hardened piece of casting material which extends into the recesses to connect the first and second parts to each other.

9. The securing body according to claim 1, wherein said casing comprises a plurality of separating elements which define a plurality of chambers adapted to receive parts of a multi-part workpiece.

10. The securing body according to claim 1, wherein said parts include a first and a second part defining a crossover region, and further comprising at least one removable insert adjacent said region.

11. A securing body for workpieces which cannot be readily clamped directly on a machine tool, particularly for turbine blades, in which at least one portion of the workpiece is received in at least one cavity within the securing body and the remaining space between the workpiece portion and the adjacent walls surrounding the at least one cavity is filled with a hardenable casting material, comprising a casing having a plurality of separable parts which define the at least one cavity, at least one of said parts being rigid with reference surfaces adapted to permit clamping of said one part on a machine tool; and sealing means disposed in the at least one cavity at least along one edge of the workpiece and arranged to maintain the at least one edge free of casting material to thereby prevent the formation of a closed, hardened coating of casting material around the workpiece.

12. The securing body according to claim 1, wherein said casing comprises a firs part and a second part.

13. The securing body according to claim 12, wherein said first part is supposed at a level above said second part when said one part is clamped on the machine tool.

14. The securing body according to claim 11, wherein said reference surfaces are provided directly on said one part.

15. The securing body according to claim 11, further comprising a clampable element connected to one of said parts, said reference surfaces being provided on said clampable element.

16. The securing body according to claim 11, wherein said at least one cavity has a mouth and further comprising second sealing means disposed adjacent the mouth of the at least one cavity to surround a projecting portion of the workpiece and to thereby minimize escape of flowable casting material from said casing, said second sealing means including a strip which fills a portion of the at least one cavity in said casing.

17. The securing body according to claim 11, wherein said casing comprises a first part and a second part, each of said first and second parts having a recess for a unitary hardened piece of casting material which extends into the recesses to connect the first and second parts to each other.

18. The securing body according to claim 11, wherein said casing comprises a s plurality of separating elements which define a plurality of chambers adapted to receive parts of a multi-part workpiece.

19. The securing body according to claim 11, wherein said parts include a first and a second part defining a cross-over region and further comprising at least one removable insert adjacent said region.

20. A securing body for workpieces which cannot be readily clamped directly on a machine tool, particularly for turbine blades, in which at least one portion of the workpiece is received in at least one cavity within the securing body and the remaining space between the workpiece portion and the adjacent walls surrounding the cavity is filled with a hardenable casting material, comprising casing having a plurality of separable parts which define the at least one cavity, at least one of said parts being rigid with reference surfaces adapted to permit clamping of said one part of a machine tool, said parts including a first part and a second part and each of said fist and second parts having a recess for a unitary hardened piece of casting material which extends into the recesses to connect the first and second parts to each other.

21. The securing body according to claim 20, wherein one of said parts is disposed at a level above another of said parts when the part which is rigid with said reference surfaces is clamped on the machine tool.

22. The securing body according to claim 20, wherein said reference surfaces are provided directly on said one part.

23. The securing body according to claim 20, further comprising a clampable element connected to one of said parts, said reference surfaces being provided on said clampable element.

24. The securing body according to claim 20, further comprising sealing means disposed in the at least one cavity at least along one edge of the workpiece and arranged to maintain the at least one edge free of casting material to thereby prevent the formation of a closed, hardened coating of casting material around the workpiece.

25. The securing body according to claim 20, wherein said at least one cavity has a mouth and further comprising sealing means disposed adjacent the mouth of the at least one cavity to thereby minimize escape of flowable casting material from said casing.

26. The securing body according to claim 20, wherein said casing comprises a plurality of separating elements which define a plurality of chambers adapted to receive parts of a multi-part workpiece.

27. The securing body according to claim 20, wherein two of said parts define a cross-over region and further comprising at least one removable insert adjacent said region.

28. A securing body for workpieces which cannot be readily clamped directly on a machine tool, particularly for turbine blades, in which at least one portion of the workpiece is received in at least one cavity within the securing body and the remaining space between the workpiece portion and the adjacent walls surrounding the at least one cavity is filled with a chargeable casting material, comprising a casing having a plurality roof separable parts which define the at least one cavity, at least one of said parts being rigid with reference surfaces adapted to permit clamping of said one part in a machine tool, said parts including a first and a second part defining a cross-over region; and at least one removable insert adjacent said region.

29. The securing body according to claim 28, wherein said reference surfaces are provided directly on said one part.

30. The securing body according to claim 28, further comprising a clampable element connected to one of said parts, said reference surfaces being provided on said clampable element.

31. The securing body according to claim 28, wherein said at least one cavity has a mouth and further comprising sealing means disposed adjacent the mouth of the at least one cavity to surround a projecting portion of the workpiece and to thereby minimize escape of flowable casting material from said casing.

32. The secruing body according to claim 33, wherein said sealing means includes a skip which fills a portion of the at least one cavity in said casing/.

33. The securing body according to claim 28, further comprising sealing means disposed in the at least one cavity at least along one edge of the workpiece and arranged to maintain the one edge free of casting material to thereby prevent the formation of a closed, hardened coating of casting material around the workpiece.

34. The securing body according to claim 28, wherein two of said parts have recesses for a unitary hardened piece of casting material which extends into the recesses and connects said two parts to each other.

35. The securing body according to claim 28, wherein said casing comprises a plurality of separating elements which define a plurality of chambers adapted to receive parts of a multi-part workpiece.

* * * * *